(12) United States Patent  
Nakano et al.

(10) Patent No.: US 9,799,946 B2
(45) Date of Patent: *Oct. 24, 2017

(54) COMMUNICATION TERMINAL DEVICE (71) Applicant: Murata Manufacturing Co., Ltd., Nagaokakyo-shi, Kyoto-fu (JP)

(72) Inventors: Shinichi Nakano, Nagaokakyo (JP); Hiroyuki Kubo, Nagaokakyo (JP); Kuniaki Yosui, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/955,133

(22) Filed: Dec. 1, 2015

(65) Prior Publication Data

US 2016/0086074 A1    Mar. 24, 2016

Related U.S. Application Data

(63) Continuation of application No. 13/760,196, filed on Feb. 6, 2013, now Pat. No. 9,236,651, which is a (Continued)

(30) Foreign Application Priority Data

Oct. 21, 2010   (JP) ................................ 2010-236127
Oct. 21, 2010   (JP) ................................ 2010-236141

(51) Int. Cl.
*H01Q 1/24*      (2006.01)
*H01Q 7/06*      (2006.01)
(Continued)

(52) U.S. Cl.
CPC ......... *H01Q 1/243* (2013.01); *G06K 19/0723* (2013.01); *G06K 19/07773* (2013.01);
(Continued)

(58) Field of Classification Search
None
See application file for complete search history.

(56) References Cited

U.S. PATENT DOCUMENTS 8,466,839 B2 *  6/2013  Schlub .................. H01Q 1/243
                                                          343/702
9,236,651 B2 *  1/2016  Nakano .................. H01Q 1/243
(Continued)

OTHER PUBLICATIONS

Nakano et al., "Communication Terminal Device", U.S. Appl. No. 13/760,196, filed Feb. 6, 2013.

*Primary Examiner* — Robert Karacsony
(74) *Attorney, Agent, or Firm* — Keating & Bennett, LLP (57) ABSTRACT

An RFID antenna is arranged in the vicinity of a metal portion of and on an outer surface side of a casing of a communication terminal device. The RFID antenna includes a magnetic core, and a coil conductor that is wound around the magnetic core. The coil conductor includes a first conductor portion positioned on a first main surface side of the magnetic core and a second conductor portion positioned on the second main surface side of the magnetic core and arranged at a different position than the first conductor portion when viewed in plan from the direction of the first and second main surfaces, and the coil conductor is arranged such that the first main surface side of the magnetic core is on the metal portion side and such that the first conductor portion of the coil conductor faces a leading end portion of the casing.

21 Claims, 8 Drawing Sheets

Related U.S. Application Data continuation of application No. PCT/JP2011/073490, filed on Oct. 13, 2011.

(51) Int. Cl.
  *H04M 1/725*  (2006.01)
  *H01F 38/14*  (2006.01)
  *H01Q 1/52*  (2006.01)
  *H01Q 1/22*  (2006.01)
  *G06K 19/077*  (2006.01)
  *G06K 19/07*  (2006.01)
  *H04M 1/02*  (2006.01)

(52) U.S. Cl.
  CPC ....... *G06K 19/07781* (2013.01); *H01F 38/14* (2013.01); *H01Q 1/2216* (2013.01); *H01Q 1/521* (2013.01); *H01Q 7/06* (2013.01); *H04M 1/7253* (2013.01); *H04M 1/026* (2013.01); *H04M 2250/04* (2013.01)

(56) References Cited

U.S. PATENT DOCUMENTS

| | | | |
|---|---|---|---|
| 2006/0028384 A1* | 2/2006 | Akiho | G06K 7/0008 343/742 |
| 2007/0200773 A1* | 8/2007 | Dou | H01Q 21/28 343/702 |

* cited by examiner

COMMUNICATION TERMINAL DEVICE

BACKGROUND OF THE INVENTION

1. Field of the Invention

The present invention relates to communication terminal devices that can be used in, for example, radio frequency identification (RFID) systems in which communication is performed with external appliances via electromagnetic signals.

2. Description of the Related Art

In recent years, RFID systems utilizing an HF band, of for example, 13.56 MHz have been widely used as FeliCa (registered trademark) and near field communication (NFC) systems. For example, an antenna device for an RFID system is disclosed in Japanese Patent No. 3975918.

Figure 1:
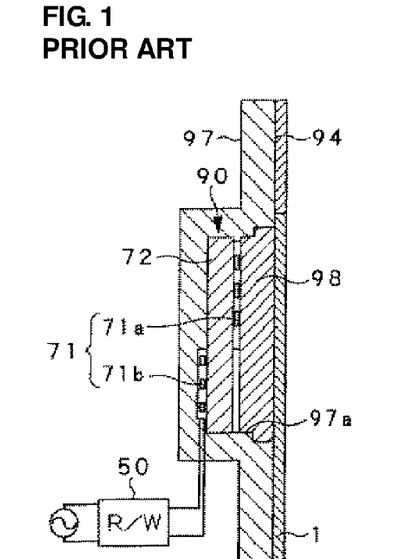
FIG. 1 is a sectional view of an antenna device section of a communication terminal device 90 described in Japanese Patent No. 3975918.

FIG. 1 is a sectional view of an antenna device section of a communication terminal device 90 described in Japanese Patent No. 3975918. This antenna device includes an asymmetrically shaped coil in which the winding intervals at two positions that face each other across a central portion of the winding region of the coil 71 have been made to be different from each other. At a large winding interval side 71a, a magnetic body 72 is arranged on a surface of the coil 71 opposite to an input-unit-94-side surface, which faces an IC card 1, of the coil 71, and at a small winding interval side 71b, the magnetic body 72 is arranged on the input-unit-94-side surface, which faces the IC card, of the coil 71. A reader/writer circuit 50 is connected to the coil 71. The antenna device is arranged in an antenna housing concavity 97a formed in a metal case 97 and is protected by a resin member 98. The magnetic field distribution of the antenna device is a distribution whose asymmetricity is more pronounced on the side 71a at which the winding interval and the line width of the coil 71 are larger. Consequently, a preferable communication state can be secured in a direction orthogonal to a main surface of the antenna device.

However, in an antenna arranged such that two conductor portions, which face each other across the central portion of the winding region of the coil conductor, are wound around a magnetic core, since the actual direction of the winding center axis of the coil conductor is neither parallel to or nor orthogonal to the main surface of the magnetic core but is tilted, there has been a problem in that it has been difficult to orient the directivity in a predetermined direction.

The antenna device of Japanese Patent No. 3975918 illustrated in FIG. 1 includes an asymmetrically shaped coil in which the winding intervals at two positions that face each other across a central portion of the winding region of the coil have been made to be different from each other and thereby the direction of magnetic flux is controlled. It is assumed that this antenna device will perform communication at a very short distance such as in communication with an RFIC card. For example, in the case where a leading end of a cellular phone terminal is brought close to a reader/writer in order to perform communication between the cellular phone terminal and the reader/writer, an antenna device is arranged in a leading end portion of the casing of the cellular phone terminal.

However, usually, it is often the case that other functional components such as, for example, a GSM or CDMA cellular phone antenna are arranged in the cellular phone terminal. Therefore, there are often restrictions on the arrangement of an antenna device in the leading end portion inside the cellular phone terminal casing. In addition, when another functional component arranged in the leading end portion is a cellular phone antenna, there are cases where the closer the arrangement position of the antenna device is to the leading end portion, the more the antenna device affects the antenna characteristics of the cellular phone antenna. On the other hand, there are cases where, provided that the antenna device is arranged at a position that is spaced away from the cellular phone antenna, it can be ensured that the two antennas are isolated from each other, but depending on the size of the terminal device, the layout becomes difficult. In addition, there are cases where, along with there being restrictions on the layout on the antenna device, there are also restrictions on the directivity direction of the antenna device.

For example, in the case where the antenna device is arranged in a trailing end portion, which is another end portion on the opposite side to the leading end portion, the antenna gain at the time of use when the leading end of the cellular phone terminal is held over the reader/writer, is inevitably reduced.

In addition, in the case where two cellular phone terminals are brought close to each other in order to perform communication, communication is performed in a state where the leading end portions of the two terminals are brought close to each other, and the same problem also occurs in this case.

SUMMARY OF THE INVENTION

Preferred embodiments of the present invention provide a communication terminal device that includes an antenna device with which it is assumed that communication will be performed at a very short distance such as communication with an RFIC card, and in which it is unlikely that there will be restrictions on the layout and the directivity direction of the antenna device and in which, when there is an antenna of another communication system in a leading end portion of the casing, the characteristics of the antennas are affected negligibly or not at all.

A communication terminal device according to a preferred embodiment of the present invention includes a casing that includes a leading end portion, a metal portion defining at least a portion of the casing and a pair of main surfaces; and an antenna that includes a magnetic core that includes a first main surface and a second main surface, which oppose each other, and a coil conductor that is arranged on at least either of the first main surface and the second main surface of the magnetic core and is arranged close to the metal portion of the casing. The antenna is directed in a direction that is tilted toward a direction of the leading end portion from a direction perpendicular or substantially perpendicular to the main surfaces of the casing.

The coil conductor preferably includes a first conductor portion positioned on the first main surface side of the magnetic core, and a second conductor portion positioned on the second main surface side of the magnetic core and arranged at a different position than the first conductor portion when viewed in plan from a direction of the first and second main surfaces. The coil conductor is arranged such that the first main surface side of the magnetic core is on the metal portion side and such that the first conductor portion of the coil conductor faces the leading end portion.

Regarding the antenna, a position in the center of the coil conductor preferably is arranged farther toward a trailing end portion of the casing, which is an end portion on the side opposite to the leading end portion, than a position in the center of the casing in a longitudinal direction of the casing.

A preferred embodiment of the present invention is, for example, preferably used when another antenna, which is of a different communication system than the antenna, is also arranged in the vicinity of the leading end portion.

A portion of the casing in the vicinity of the leading end portion preferably is made of an insulating material.

The sizes of the magnetic core and the coil conductor are preferably chosen such that, for example, A/3≤B≤A/2 is satisfied, where A is the length of the magnetic core and B is the length of the coil conductor in a longitudinal direction of the casing.

For example, C<D/2 is preferably satisfied, where C is the length of the first conductor portion and D is the length of the second conductor portion in a longitudinal direction of the casing.

According to various preferred embodiments of the present invention, even though the antenna device is not provided in the leading end portion of the casing of the communication terminal device, communication using the leading end portion of the communication terminal device can be practically performed.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 4A and 4B illustrate the structure of the RFID antenna 101 in detail, where

DETAILED DESCRIPTION OF THE PREFERRED EMBODIMENTS

First Preferred Embodiment

Figure 2A:
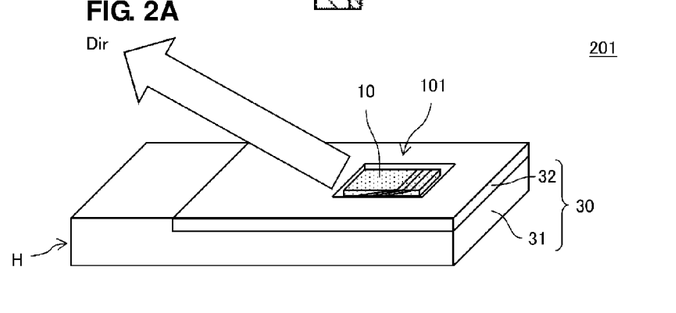
FIG. 2A is a perspective view of and FIG. 2B is a sectional view of a communication terminal device 201 of a first preferred embodiment of the present invention.
Figure 2B:
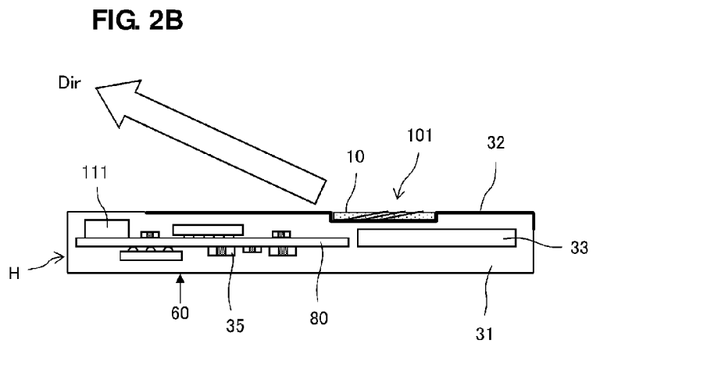

FIG. 2A is a perspective view of and FIG. 2B is a sectional view of a communication terminal device 201 according to a first preferred embodiment of the present invention. A casing 30 of the communication terminal device 201 includes two main surfaces, a resin portion 31 substantially including a resin material, and a metal portion 32 substantially including a metal material. Communication is performed by pointing an area in the vicinity of a leading end portion H of the casing 30 of the communication terminal device 201 toward a communication partner of an RFID antenna 101. The RFID antenna 101 is arranged in the vicinity of the metal portion 32 of the casing 30 and on an outer surface of the casing. The RFID antenna 101 preferably is for use in an RFID system antenna that utilizes a HF band of 13.56 MHz, for example.

In FIGS. 2A and 2B, the display side (input unit/display unit) 60 of the communication terminal device 201 is illustrated as facing downward. For example, a substrate (printed wiring board) 80 and a battery pack 33 are incorporated into the casing 30. A large number of components 35 are mounted on the front and back surfaces of the substrate 80. A cellular phone antenna 111 is arranged in the vicinity of the leading end portion H of the casing 30. An arrow Dir in FIGS. 2A and 2B roughly indicates a directivity direction of the RFID antenna 101, as will be described below.

The cellular phone antenna 111 preferably is a CDMA or GSM system cellular phone antenna having a band of, for example, 800 MHz, 900 MHz, 1.8 MHz or 1.9 MHz. The cellular phone antenna 111 preferably is a chip antenna in which a radiating electrode is provided on the outer surface of a dielectric block and is surface mounted on the substrate 80. The cellular phone antenna 111 is arranged in the resin portion 31 at a position not covered by the metal portion 32 of the casing 30. In other words, the metal portion 32 is provided in a region that does not cover an area in the vicinity of the cellular phone antenna 111. Thus, the cellular phone antenna 111 is not shielded by metal material of the metal portion 32.

The cellular phone antenna 111 is not limited to being a chip antenna, and, for example, may instead be an antenna manufactured by sheet metal working such as a planar inverted-F antenna. That is, it is sufficient that the cellular phone antenna 111 function as an antenna for the main system (for telephone calls, for example, of the cellular phone.

The cellular phone antenna 111 is arranged in the vicinity of the leading end portion H of the casing 30 and therefore is spaced apart from a position at which a person's hand holds the casing and so a reduction in the antenna gain of the cellular phone antenna 111 when a telephone call is made can be prevented. In addition, in clam-shell-type, swivel-type and straight-type cellular phone terminals, the cellular phone antenna 111 is arranged in the leading end portion of the side of the casing which the caller grips when the casing is in an extended state such that the cellular phone antenna 111 is spaced apart from the caller (person's body) and therefore coupling with the person's body is reduced. The arrangement position of the cellular phone antenna 111 is not particularly limited to being in the vicinity of the leading end portion H.

The metal portion 32 lies between the RFID antenna 101 and the cellular phone antenna 111 and therefore the two antennas only negligibly interfere with each other and the antenna characteristics of the respective antennas are secured.

In addition, the metal portion 32 also lies between the RFID antenna 101 and other constituent components of the communication terminal device 201 such as the battery pack 33 and the mounted components 35, and therefore the RFID antenna 101 and the constituent components only negligibly interfere with each other and their respective characteristics are secured.

In FIGS. 2A and 2B, for convenience of illustrating the RFID antenna 101, the RFID antenna 101 is illustrated as being exposed, but, as will be described below, an insulating cover sheet that covers the RFID antenna 101 is adhered to the front surface of the metal portion 32 of the casing 30.

Figure 3:
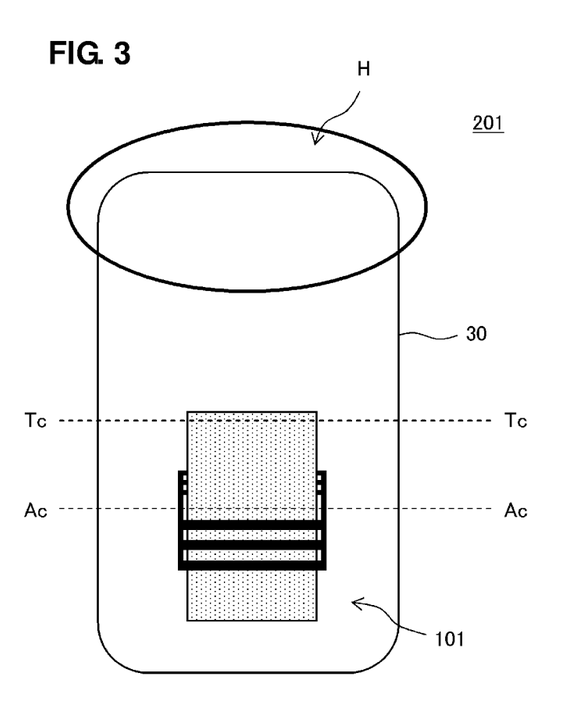
FIG. 3 is a plan view illustrating the positional relationship of an RFID antenna 101 inside a casing 30 of the communication terminal device 201.

FIG. 3 is a plan view illustrating the positional relationship of the RFID antenna 101 inside the casing 30 of the communication terminal device 201. A center Ac-Ac of the RFID antenna 101 lies at a position farther toward the trailing end (end portion on opposite side to leading end portion H) of the casing 30 than a center Tc-Tc of the casing 30 of the communication terminal device 201.

It is preferable that the RFID antenna 101 be arranged farther toward the trailing end than the center Tc-Tc of the casing 30, so that isolation of the cellular phone antenna 111 can be secured with certainty, but the arrangement is not limited to this. For example, provided that the RFID antenna 101 is arranged farther toward the trailing end side than any one of the functional components arranged in the leading end portion such as the cellular phone antenna 111, an effect is obtained that communication using the leading end portion of the communication terminal device can be practically performed even though the RFID antenna 101 is not provided in the leading end portion of the casing of the communication terminal device.

As functional components arranged in the leading end portion, other than the cellular phone antenna 111, a battery pack, a television antenna, a wireless module or a memory card, for example, can be arranged.

Figure 4A:
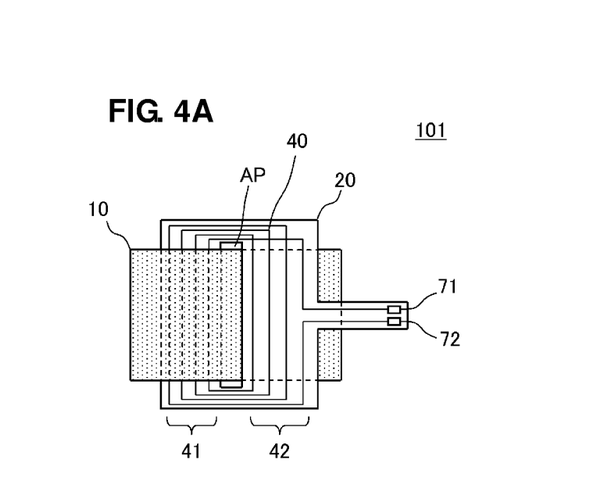
FIG. 4A is a plan view of the RFID antenna 101 and FIG. 4B is a partial sectional view of the communication terminal device which includes the RFID antenna 101.
Figure 4B:
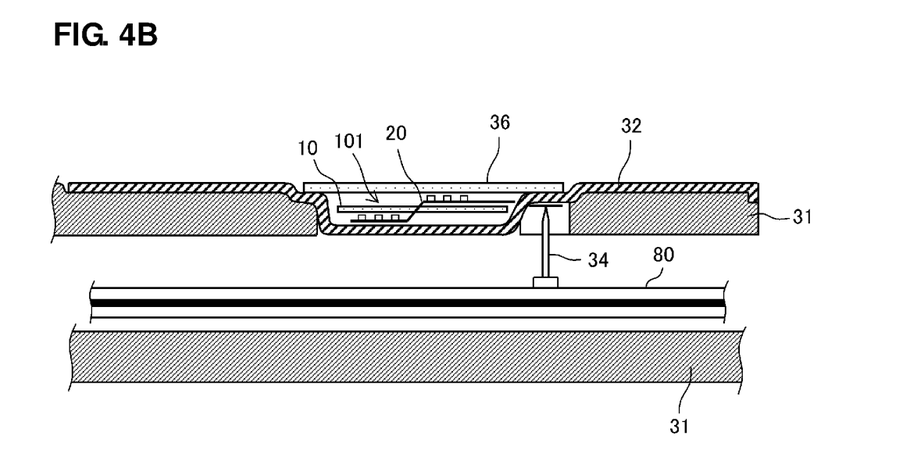

FIGS. 4A and 4B illustrate the structure of the RFID antenna 101 in detail, where FIG. 4A is a plan view of the RFID antenna 101 and FIG. 4B is a partial sectional view of the communication terminal device 201 which includes the RFID antenna 101.

As illustrated in FIG. 4A, the RFID antenna 101 includes a magnetic core 10 including a first main surface and a second main surface that oppose each other, and a coil conductor 40 that is wound around the magnetic core 10. The coil conductor 40 is located on a flexible substrate 20 and includes a first conductor portion 41 and a second conductor portion 42. An aperture AP, through which the magnetic core 10 is inserted, is provided in the flexible substrate 20. The two ends of the coil conductor 40 serve as input/output terminals 71 and 72. The magnetic core 10 preferably is a mixture of ferrite powder and a resin material arranged to have a rectangular or substantially rectangular parallelepiped shape or is a sintered ferrite plate, for example.

The coil conductor 40 includes the first conductor portion positioned on the first main surface side of the magnetic core 10 and the second conductor portion 42 positioned on the second main surface side of the magnetic core 10 and arranged at a different position than the first conductor portion 41 when viewed in plan from the direction of the first and second main surfaces. The RFID antenna 101 is arranged such that the first main surface side of the magnetic core 10 is on the metal portion 32 side and such that the first conductor portion 41 of the coil conductor 40 faces the leading end portion (left end in FIGS. 4A and 4B).

With this configuration, as illustrated by arrow Dir in FIGS. 2A and 2B, the RFID antenna 101 is directed in a direction that is tilted toward a direction of the leading end portion H from a direction perpendicular or substantially perpendicular to the main surface of the casing 30.

The substrate 80 inside the communication terminal device is provided with contact pins 34 and leading ends of the contact pins are in electrically conductive contact with the input/output terminals 71 and 72. Portions of the input/output terminals 71 and 72 of the flexible substrate 20 are interposed between the metal portion 32 and tips of the contact pins 34. A slit is preferably provided to allow portions (lead out portions) of the input/output terminals 71 and 72 of the flexible substrate in the metal portion 32 to be lead into the inside of the casing.

A concavity is provided in the front surface of the metal portion 32 of the casing, the RFID antenna 101 is housed in this concavity and an insulating cover sheet 36 that covers the RFID antenna 101 is adhered to the front surface of the metal portion 32.

The metal portion 32 lies between the RFID antenna 101 and the substrate 80 and therefore the RFID antenna 101 is not electromagnetically coupled with, for example, the battery pack 33, the ground conductor of the substrate 80 and mounted components, and there is no mutual negative influence therebetween.

Figures 5A, 5B:
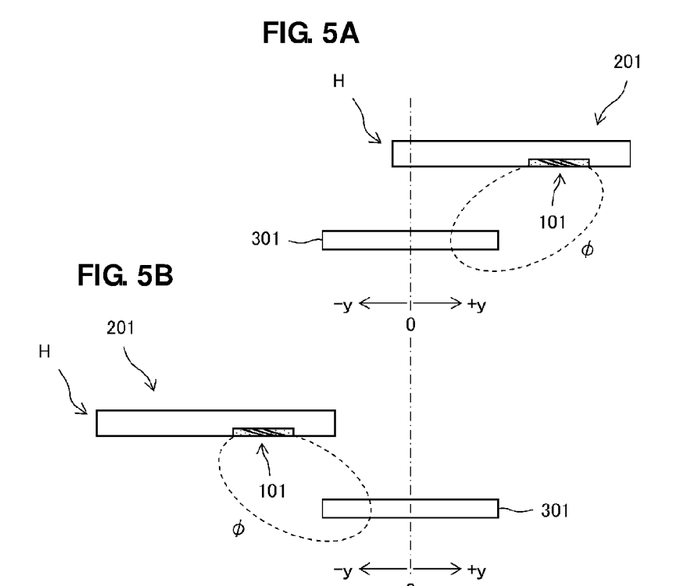
FIG. 5A and FIG. 5B illustrate examples of the positional relationship between the communication terminal device 201 and a reader/writer antenna 301, which is a communication partner.

FIG. 5A and FIG. 5B illustrate examples of the positional relationship between the communication terminal device 201 and the reader/writer antenna 301, which is the communication partner of the RFID antenna 101. A broken line in the figure represents a typical loop of magnetic flux φ. FIG. 5A illustrates a state in which the leading end portion H of the communication terminal device 201 is held at a position substantially in the center of the reader/writer antenna 301. In this state, the magnetic flux φ of the reader/writer antenna 301 links the reader/writer antenna 301 and the RFID antenna 101, and the reader/writer antenna 301 and the RFID antenna 101 are electromagnetically coupled with each other.

FIG. 5B illustrates a state in which the trailing end portion (on side opposite to leading end portion H) of the communication terminal device 201 is held at a position substantially in the center of the reader/writer antenna 301. Also in this state, the magnetic flux φ of the reader/writer antenna 301 links the reader/writer antenna 301 and the RFID antenna 101, and the reader/writer antenna 301 and the RFID antenna 101 are electromagnetically coupled with each other.

Figure 6:
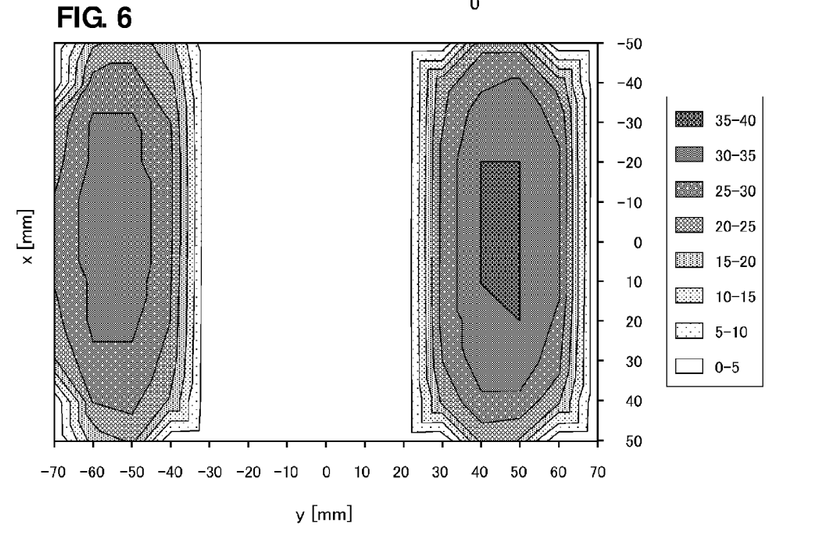
FIG. 6 illustrates the relationship between the positional relationships between the reader/writer antenna 301 and the RFID antenna 101 illustrated in FIGS. 5A and 5B and the gain of the RFID antenna 101.

FIG. 6 illustrates the relationship between the positional relationships between the reader/writer antenna 301 and the RFID antenna 101 illustrated in FIGS. 5A and 5B and the gain of the RFID antenna 101. The horizontal axis indicates the position along the y-axis direction illustrated in FIG. 5A and FIG. 5B, and a state in which the center of the RFID antenna 101 in the y-axis direction is located at the center of the reader/writer antenna 301 in the y-axis direction is taken to be y=0. The vertical axis indicates the position in a direction perpendicular or substantially perpendicular to the plane of the paper of FIG. 5A and FIG. 5B, and a state in which the center of the RFID antenna 101 in the x-axis direction is located at the center of the reader/writer antenna 301 in the x-axis direction is taken to be x=0.

In this example, preferably the dimension of the communication terminal device 201 in the y-axis direction (longitudinal direction) is about 100 mm and the distance from the leading end portion H of the casing 30 (refer to FIG. 3) to a position in the center of the RFID antenna 101 is about 60 mm, for example. In the first preferred embodiment, the peak gain is generated when y≈45 mm, for example. That is, in the state illustrated in FIG. 5A, when the distance from the reader/writer antenna 301 to a position in the center of the RFID antenna 101 is approximately 45 mm, that is, in a state where a position approximately 15 mm from the leading end portion H of the communication terminal device 201 (approximately 60 mm–approximately 45 mm) is held over the center of the reader/writer antenna 301, the peak gain is obtained.

Thus, in spite of the RFID antenna 101 being arranged farther toward the trailing end portion (held portion) of the casing of the communication terminal device 201 (that is, since a position in the center of the coil conductor 40 of the RFID antenna 101 is arranged farther toward the trailing end portion than a position in the center of the casing 30 in the longitudinal direction), communication can be performed by holding the leading end portion H over the reader/writer antenna 301.

In FIG. 6, a peak is also generated at a position of y≈−55 mm, for example, and this corresponds to the state illustrated in FIG. 5B.

Second Preferred Embodiment

Figure 7:
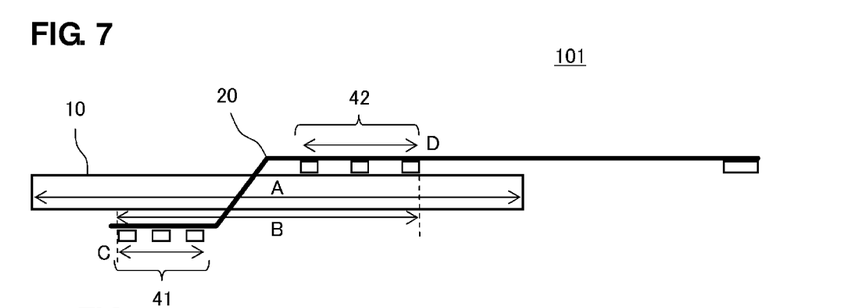
FIG. 7 is a partial sectional view of the RFID antenna 101.

In a second preferred embodiment of the present invention, the relationship between the sizes of the coil conductor and the magnetic core of the RFID antenna and the gain of the RFID antenna will be described. FIG. 7 is a partial sectional view of the RFID antenna 101. The configuration of the RFID antenna 101 is preferably the same as that described in the first preferred embodiment. In FIG. 7, the dimensions of the components are as follows.
A: length of magnetic core 10
B: width of coil conductor (length in y-axis direction)
C: width of first coil portion (length in y-axis direction)
D: width of second coil portion (length in y-axis direction)

Figure 8:
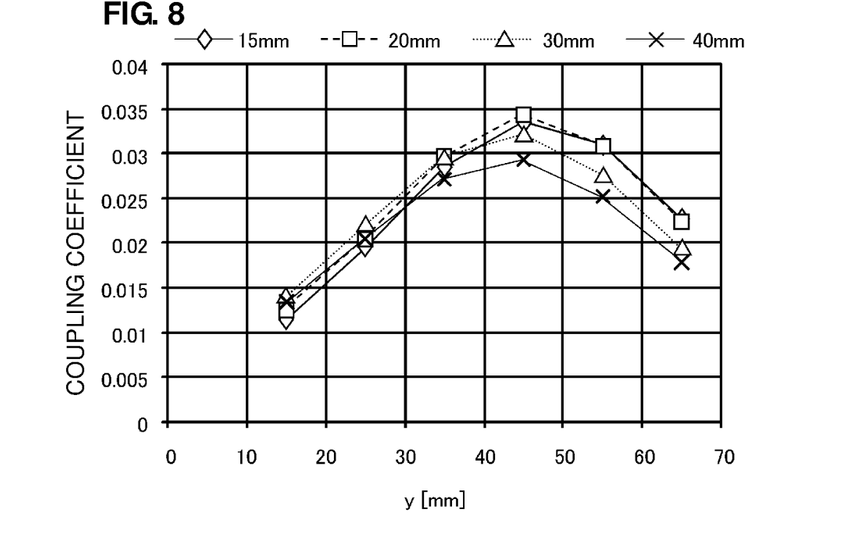
FIG. 8 illustrates the relationship between the positional relationships between the reader/writer antenna 301 and the RFID antenna 101 illustrated in FIG. 5A and FIG. 5B in the first preferred embodiment and the coupling coefficient between the reader/writer antenna 301 and the RFID antenna 101.

FIG. 8 illustrates the relationship between the positional relationships between the reader/writer antenna 301 and the RFID antenna 101 illustrated in FIG. 5A and FIG. 5B in the first preferred embodiment and the coefficient of coupling between the reader/writer antenna 301 and the RFID antenna 101. The horizontal axis indicates the position along the y-axis direction illustrated in FIG. 5A and FIG. 5B, and a state in which the center of the RFID antenna 101 in the y-axis direction is located at the center of the reader/writer antenna 301 in the y-axis direction is taken to be y=0. The vertical axis indicates the coefficient of coupling between the reader/writer antenna 301 and the RFID antenna 101. In FIG. 8, the dimension B (width of coil conductor) is taken as a parameter and the relationship between the coupling coefficient and the position in the y-axis direction is illustrated. The conditions with which these characteristics are obtained are as follows.
Magnetic Core 10
  length (dimension A)=about 40 mm
  width=about 20 mm
Coil Conductor
  width=about 24 mm Here, the gap between the reader/writer antenna 301 and the RFID antenna 101 is about 40 mm.

As is clear from FIG. 8, regardless of the dimension B (width of the coil conductor), the coupling coefficient peaks when the distance from the reader/writer antenna 301 (refer to FIG. 5A and FIG. 5B) to a position in the center of the RFID antenna 101 is approximately 45 mm, for example. The peak in the coupling coefficient is largest when the dimension B is approximately 20 mm, for example. When the dimension B is smaller or larger than approximately 20 mm, the peak of the coupling coefficient is reduced.

From this, it can be understood that large gain is obtained in the range $A/3 \leq B \leq A/2$.

Third Preferred Embodiment

Figure 9A:
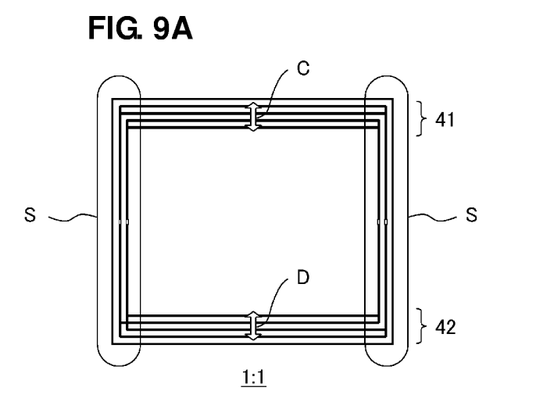
FIGS. 9A-9C are plan views illustrating three shapes for the coil conductor of the RFID antenna.
Figure 9B:
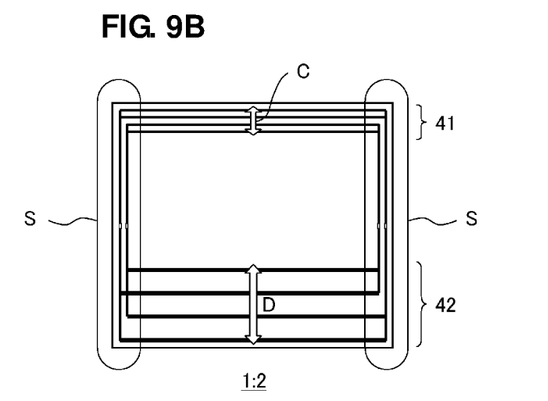
Figure 9C:
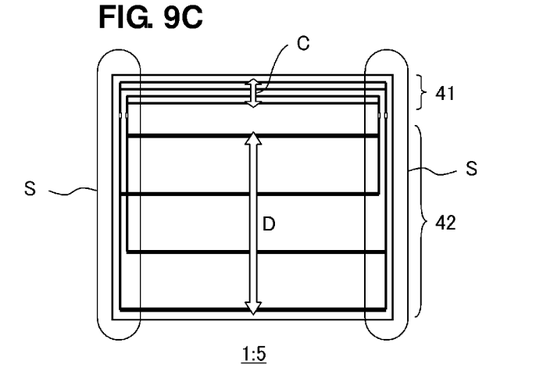

In a third preferred embodiment of the present invention, the relationship between the pattern of the coil conductor of the RFID antenna and the gain of the RFID antenna will be described. FIGS. 9A-9C are plan views illustrating three example shapes for the coil conductor of the RFID antenna. In FIGS. 9A-9C, the width C of the first conductor portion 41 is constant and the width D of the second conductor portion 42 is different in FIG. 9A, FIG. 9B and FIG. 9C. The ratio between the first conductor portion 41 and the second conductor portion 42 is 1:1 in the example illustrated in FIG. 9A, 1:2 in the example illustrated in FIG. 9B and 1:5 in the example illustrated in FIG. 9C.

In the first and second preferred embodiments, examples were described in which the coil conductor is formed on only one surface of the flexible substrate, whereas in the examples illustrated in FIGS. 9A-9C, both the first conductor portion 41 and the second conductor portion 42 are formed on both surfaces of the flexible substrate. In FIGS. 9A-9C, the coil conductor on the back surface of the flexible substrate is illustrated in a see-through manner. Connection portions S that connect the first conductor portion 41 and the second conductor portion 42 are also provided on both surfaces of the flexible substrate and are arranged at overlapping positions when viewed in plan, and therefore two patterns on the left and right are illustrated in FIGS. 9A-9C.

Figure 10:
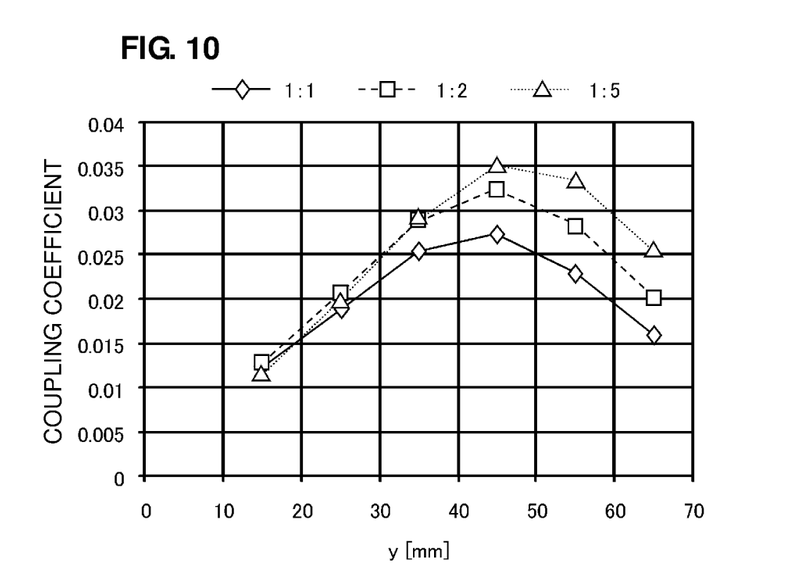
FIG. 10 illustrates the relationship between the positional relationships illustrated in FIGS. 5A and 5B in the first preferred embodiment between the reader/writer antenna 301 and the RFID antennas illustrated in FIGS. 9A-9C and the coupling coefficient between the reader/writer antenna 301 and the RFID antennas.

FIG. 10 illustrates the relationship between the positional relationships between the reader/writer antenna 301 illustrated in FIGS. 5A and 5B in the first preferred embodiment and the RFID antenna illustrated in FIGS. 9A-9C and the coefficient of coupling between the reader/writer antenna 301 and the RFID antenna. The horizontal axis indicates the position in the y-axis direction illustrated in FIG. 5A and FIG. 5B, and a state in which the center of the RFID antenna in the y-axis direction is located at the center of the reader/writer antenna 301 in the y-axis direction is taken to be y=0. The vertical axis indicates the coefficient of coupling between the reader/writer antenna 301 and the RFID antenna. In FIG. 10, the ratio between the first conductor portion 41 and the second conductor portion 42 is taken as a parameter and the relationship between the coupling coefficient and the position in the y-axis direction is illustrated. The conditions with which these characteristics are obtained are described in the second preferred embodiment.

As is clear from FIG. 10, regardless of the ratio between the first conductor portion 41 and the second conductor portion 42, the coupling coefficient peaks when the distance from the reader/writer antenna 301 (refer to FIG. 5A and FIG. 5B) to a position in the center of the RFID antenna 101 is approximately 45 mm, for example. The peak in the coupling coefficient is largest when the ratio between the first conductor portion 41 and the second conductor portion 42 is about 1:5, for example. The smaller this ratio is (the closer it is to 1:1), the more the coupling coefficient peak is reduced.

From this, it is clear that the larger the width D of the second conductor portion 42, the higher the coupling coefficient peak and the higher the gain obtained. At least, provided that the condition C<D/2 is satisfied, an effect of an improvement in antenna gain is obtained.

Fourth Preferred Embodiment

Figure 11A:
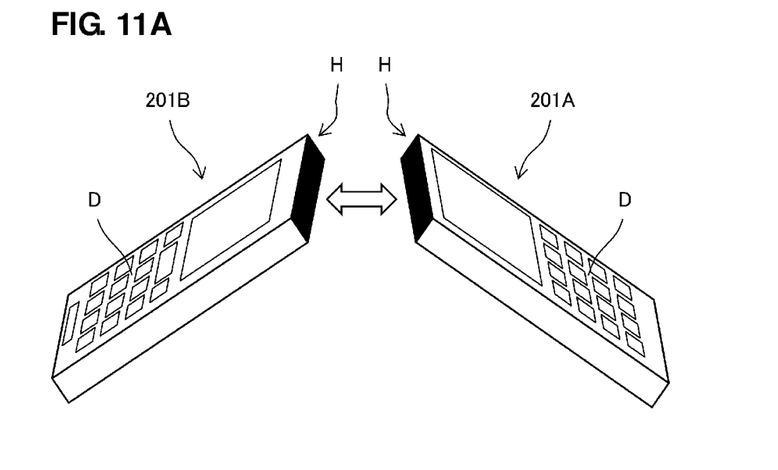
FIGS. 11A and 11B illustrate a situation in which communication is performed between communication terminal devices 201A and 201B.
Figure 11B:
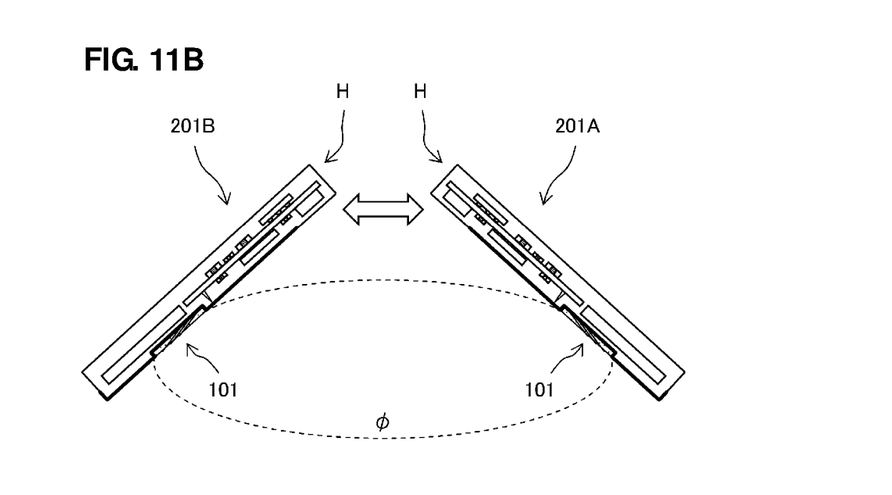

In a fourth preferred embodiment of the present invention, an example will be described of communication between communication terminal devices. FIGS. 11A and 11B illustrate a situation in which communication is performed between a communication terminal device 201A and a communication terminal device 201B. FIG. 11A is a perspective view illustrating a state in which communication is performed between the two communication terminal devices and FIG. 11B is a sectional view. The configuration of the two communication terminal devices 201A and 201B is preferably the same as any of those described in the first to third preferred embodiments. As illustrated in FIGS. 11A and 11B, communication is performed in a state in which the respective leading end portions H of the two communication terminal devices 201A and 201B have been brought close together.

In FIG. 11B, as illustrated by the broken line, magnetic flux φ, which passes through the magnetic cores of the RFID antennas 101 of the two communication terminal devices 201A and 201B, is generated. Consequently, communication can be performed with a method of use that makes it seem as though communication is being performed between the leading end portions of the two communication terminal devices 201A and 201B.

Other Preferred Embodiments

In each of the preferred embodiments of the present invention, as the RFID antenna 101, an RFID antenna has been preferably used that includes a first conductor portion that is positioned on the first main surface side of the magnetic core 10 and a second conductor portion 42 that is positioned on the second main surface side of the magnetic core 10 and is arranged at a different position than the first conductor portion 41 when viewed in plan from the direction of the first and second main surfaces, but the present invention is not limited to this. For example, a configuration may be adopted in which an RFID antenna is used that is oriented in a direction perpendicular or substantially perpendicular to the first main surface of the magnetic core 10 and the antenna is arranged so as to be tilted toward a direction of the leading end portion such that the antenna is directed in a direction that is tilted toward a direction of the leading end portion from a direction perpendicular or substantially perpendicular to a main surface of the casing. Considering, for example, the installation space of the RFID antenna 101 (in particular, the space in the thickness direction of the installation section), it is preferable that an RFID antenna be used that includes a first conductor portion positioned on the first main surface side of the magnetic core 10 and a second conductor portion 42 that is positioned on the second main surface side of the magnetic core 10 and is arranged at a different position than the first conductor portion 41 when viewed in plan from the direction of the first and second main surfaces.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A communication terminal device comprising:
   a casing that includes a leading end portion, and a pair of main surfaces;
   a metal material; and
   an antenna that includes a magnetic core including a first main surface and a second main surface, which oppose each other, and a coil conductor that is arranged on at least either of the first main surface and the second main surface of the magnetic core and is arranged adjacent to the metal material; wherein
   the antenna has a directivity direction that is tilted toward a direction of the leading end portion from a direction that is perpendicular or substantially perpendicular to the pair of main surfaces of the casing; and
   another antenna, which belongs to a different communication system than the antenna, is arranged in an area of the leading end portion.

2. The communication terminal device according to claim 1, wherein a portion of the casing in the area of the leading end portion is made of an insulating material.

3. The communication terminal device according to claim 1, wherein sizes of the magnetic core and the coil conductor are such that $A/3 \leq B \leq A/2$ is satisfied, where A is a length of the magnetic core and B is a length of the coil conductor in a longitudinal direction of the casing.

4. The communication terminal device according to claim 1, wherein the coil conductor includes a first conductor portion positioned on a side of the first main surface of the magnetic core and a second conductor portion positioned on a side of the second main surface of the magnetic core and arranged at a different position than the first conductor portion when viewed in a direction perpendicular to the first and second main surfaces.

5. The communication terminal device according to claim 4, wherein C<D/2 is satisfied, where C is a length of the first conductor portion and D is a length of the second conductor portion in a longitudinal direction of the casing.

6. The communication terminal device according to claim 1, wherein the antenna is an RFID antenna.

7. The communication terminal device according to claim 6, wherein the another antenna is a cellular phone antenna.

8. The communication terminal device according to claim 7, wherein the casing includes a resin portion, and the cellular phone antenna is provided in the resin portion.

9. The communication terminal device according to claim 7, wherein the metal material is located between the RFID antenna and the cellular phone antenna.

10. The communication terminal device according to claim 6, further comprising a battery pack and mounted components, wherein the metal material is located between the RFID antenna and the battery pack and the mounted components.

11. The communication terminal device according to claim 1, wherein the casing includes a concavity containing the antenna, and an insulating sheet is arranged to cover the antenna.

12. The communication terminal device according to claim 6, wherein the casing includes a substrate, and the metal material is located between the RFID antenna and the substrate.

13. The communication terminal device according to claim 12, wherein the substrate is a printed wiring board and includes contact pins arranged to be electrically connected to input/output terminals.

14. The communication terminal device according to claim 13, wherein the antenna includes a substrate on which the coil conductor is located, and the input/output terminals are provided on the substrate.

15. The communication terminal device according to claim 14, wherein portions of the input/output terminals are located between the metal material and the contact pins.

16. An RFID system comprising the communication terminal device according to claim 1.

17. The RFID system according to claim 16, wherein the antenna is an RFID antenna.

18. The RFID system according to claim 17, wherein the another antenna is a cellular phone antenna.

19. The communication terminal device according to claim 4, wherein
the antenna is adjacent to one of the pair of main surfaces of the casing;
the other one of the pair of main surfaces of the casing is closer to the first conductor portion than to the second conductor portion; and
the leading end portion is closer to the first conductor portion than to the second conductor portion.

20. The communication terminal device according to claim 1, wherein the another antenna is disposed between a leading end of the leading end portion of the casing and the antenna.

21. The communication terminal device according to claim 19, wherein the another antenna is closer to the first conductor portion than to the second conductor portion.

\* \* \* \* \*